C. J. MILLER, Jr.
CHURN.

No. 96,604. Patented Nov. 9, 1869.

Witnesses:

Inventor: C. J. Miller Jr.

United States Patent Office.

C. J. MILLER, JR., OF RICHMOND, KENTUCKY.

Letters Patent No. 96,604, dated November 9, 1869.

IMPROVEMENT IN CHURNS.

The Schedule referred to in these Letters Patent and making part of the same.

*To all whom it may concern:*

Be it known that I, C. J. MILLER, Jr., of Richmond, in the county of Madison, and State of Kentucky, have invented a new and improved Churn; and I do hereby declare that the following is a full, clear, and exact description thereof, which will enable others skilled in the art to make and use the same, reference being had to the accompanying drawings forming part of this specification, in which—

Similar letters of reference indicate corresponding parts.

This invention relates to a new churn, which is so constructed that it will serve to produce butter with great rapidity and without loss of cream.

The invention consists in the use of a fluted churn, and in the combination of the same with a peculiar double-winged dasher.

Figure 1:
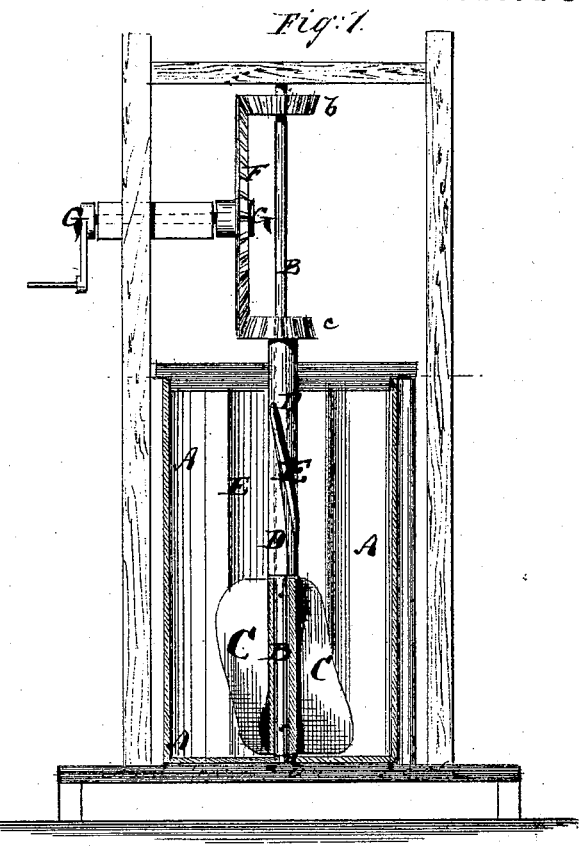
Figure 1 represents a side view, partly in section, of my improved churn.
Figure 2:
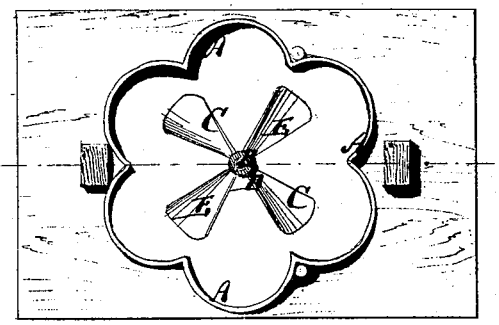
Figure 2 is a plan or top view, partly in section, of the same.

A, in the drawing, represents the churn. It is an upright vessel, made of sheet-metal or other suitable material, of fluted form, as in fig. 2, so that where the rounded sections are formed, inward-projecting edges will be produced within the churn, to form larger surface and greater resistance to the motion of the cream.

B is the dasher-shaft. It is placed vertically into the churn, resting on a step, $a$, in the same, and is provided with a bevel-pinion, $b$, or its equivalent, to receive rotary motion.

On the lower part of the dasher-rod are fastened two or more wings, C C.

On the upper part of the dasher-rod is a loose sleeve, D, carrying wings E E, and a pinion, $c$.

The pinions $b\ c$ mesh into the same wheel, F, on opposite sides of its shaft G, and are therefore revolved in opposite directions, so that consequently the wings C and E will also be turned in contrary directions. The cream in the churn is thereby greatly agitated and butter rapidly produced. The form of churn also aids considerably in the rapid production of the butter.

Having thus described my invention,

I claim as new, and desire to secure by Letters Patent—

The fluted churn, in combination with the double-winged dasher, whose wings revolve in contrary directions, substantially as herein shown and described.

C. J. MILLER, JR.

Witnesses:
T. STANHOPE ELLIS,
R. C. CHENAULT.